US008848701B2

(12) United States Patent
Rados et al.

(10) Patent No.: US 8,848,701 B2
(45) Date of Patent: Sep. 30, 2014

(54) SPLIT USAGE OF RADIO ACCESS NETWORKS WITH IMS

(75) Inventors: Steven R. Rados, Danville, CA (US); John F. Macias, Antelope, CA (US); David Chiang, Fremont, CA (US); Lalit R. Kotecha, San Ramon, CA (US); Yee Sin Chan, San Jose, CA (US); Jay J. Lee, San Ramon, CA (US); Thomas W. Haynes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 284 days.

(21) Appl. No.: 13/173,397

(22) Filed: Jun. 30, 2011

(65) Prior Publication Data

US 2013/0003652 A1 Jan. 3, 2013

(51) Int. Cl.
*H04L 12/50* (2006.01)
*H04W 48/18* (2009.01)
*H04W 88/06* (2009.01)

(52) U.S. Cl.
CPC ............... *H04W 48/18* (2013.01); *Y02B 60/50* (2013.01); *H04W 88/06* (2013.01)
USPC ............................ 370/385; 370/277; 370/299

(58) Field of Classification Search
USPC .......................................... 370/277, 299, 385
See application file for complete search history.

(56) References Cited

U.S. PATENT DOCUMENTS

| | | | | |
|---|---|---|---|---|
| 6,560,443 B1 * | 5/2003 | Vaisanen et al. | ................. | 455/73 |
| 7,249,183 B1 * | 7/2007 | Subbiah | ........................ | 709/227 |
| 7,406,324 B1 * | 7/2008 | McConnell | .................... | 455/466 |
| 7,433,677 B2 * | 10/2008 | Kantola et al. | ................. | 455/410 |
| 7,796,633 B2 * | 9/2010 | Birchler et al. | ................ | 370/437 |
| 7,920,523 B2 * | 4/2011 | Grinshpun et al. | ............ | 370/331 |
| 7,936,708 B2 * | 5/2011 | Kesavan et al. | ............... | 370/318 |
| 8,139,670 B1 * | 3/2012 | Son et al. | ....................... | 375/267 |
| 8,199,795 B2 * | 6/2012 | Lilja et al. | ...................... | 375/219 |
| 8,705,490 B2 * | 4/2014 | Lau et al. | ........................ | 370/331 |
| 2003/0036354 A1 * | 2/2003 | Lee et al. | .......................... | 455/41 |
| 2005/0159153 A1 * | 7/2005 | Mousseau et al. | .......... | 455/432.1 |
| 2005/0202828 A1 * | 9/2005 | Pecen et al. | .................... | 455/453 |
| 2007/0032239 A1 * | 2/2007 | Shaheen et al. | ................ | 455/436 |
| 2007/0173283 A1 * | 7/2007 | Livet et al. | ................... | 455/552.1 |
| 2007/0174443 A1 * | 7/2007 | Shaheen et al. | ................ | 709/223 |
| 2007/0197227 A1 * | 8/2007 | Naqvi et al. | ................... | 455/445 |
| 2009/0131080 A1 * | 5/2009 | Nadler et al. | ............... | 455/456.3 |
| 2009/0245108 A1 * | 10/2009 | Wu et al. | ......................... | 370/233 |
| 2010/0208725 A1 * | 8/2010 | Lahtinen et al. | ................ | 370/352 |
| 2010/0215001 A1 * | 8/2010 | Russell et al. | ................ | 370/329 |
| 2011/0165875 A1 * | 7/2011 | Wu | .................. | 455/436 |
| 2011/0256834 A1 * | 10/2011 | Dayal et al. | ................... | 455/67.7 |
| 2012/0315905 A1 * | 12/2012 | Zhu et al. | ....................... | 455/436 |

\* cited by examiner

*Primary Examiner* — Ricky Ngo
*Assistant Examiner* — Dewanda Samuel

(57) ABSTRACT

Different access networks may perform signaling and data delivery (bearer connection) for communication services. A device may determine, in response to a request for a service from a user of the device, whether the device is connected to a non-cellular access network. The device may transmit, when it is determined that the device is connected to the non-cellular access network, one or more control messages, relating to establishment of the service, using the non-cellular access network. The device may transmit, when it is determined that the device is not connected to the non-cellular access network, the one or more control messages, using a cellular access network. The device may establish, with a party with which the service is to connect, a bearer connection for the service over the cellular access network.

20 Claims, 8 Drawing Sheets

US 8,848,701 B2

SPLIT USAGE OF RADIO ACCESS NETWORKS WITH IMS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Mobile devices, such as smart phones, may include logic to connect to the network through multiple different radio interfaces. For instance, a mobile device may include circuits to connect to a network through an IEEE 802.11 (WiFi) access network, a Third Generation (3G) cellular access network, and/or a Fourth Generation (4G) cellular access network. The mobile device may, at certain times, simultaneously connect to multiple ones of these access networks or connect to the most preferred access network that is available.

DETAILED DESCRIPTION OF PREFERRED EMBODIMENTS

The following detailed description refers to the accompanying drawings. The same reference numbers in different drawings may identify the same or similar elements.

Techniques described herein may relate to use of different radio access networks to perform signaling and data delivery (bearer connection) for IP multimedia session (IMS) services. In one implementation, signaling for a service, such as a voice call, may be made through a WiFi access network. The signaling over the WiFi access network may specify a different network, such as a 3G cellular network, to use for the bearer portion of the voice call. The call may then be completed over the 3G cellular network. With the techniques described herein, communication sessions that need to be or that are preferably completed over one network access type (e.g., a cellular network) may use that network access type without dedicating resources, such as battery resources, to keep the transceiver circuitry associated with the resource type open.

Figure 1:
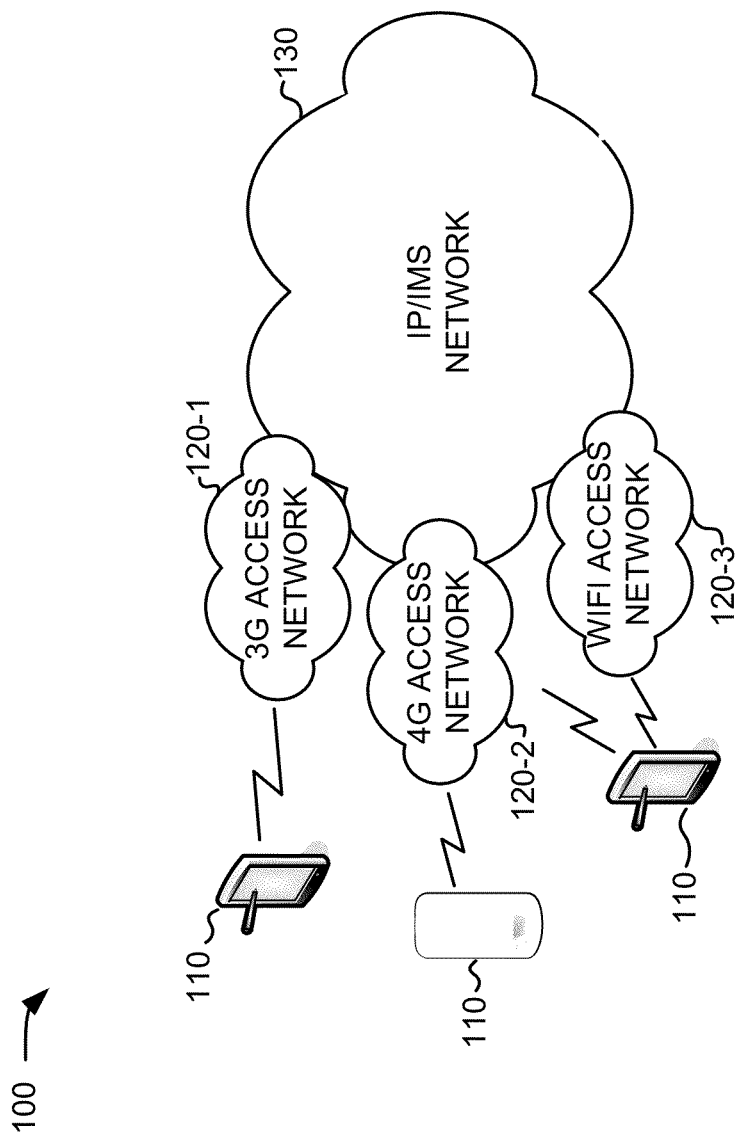
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, access networks 120-1 through 120-3, and a network 130.

Mobile devices 110 may include portable computing and communication devices, such as a personal digital assistant (PDA), a smart phone, a cellular phone, a tablet computer, a laptop with integrated connectivity to a cellular wireless network, etc. Mobile devices 110 may connect to network 130. A number of different access technologies, illustrated as access networks 120-1 through 120-3, may be used to connect a mobile device 110 to network 130. Mobile devices 110 may include logic to connect to multiple different access networks. For example, a mobile device 110 may concurrently connect to both access network 120-1 and 120-3.

Access networks 120-1 through 120-3 (collectively referred to as "access networks 120") may include logic to provide access for mobile devices 110 to network 130. Access networks 120 may include a number of different access technologies. Three example access networks are shown in FIG. 1: a 3G access network 120-1, a 4G access network 120-2, and a WiFi access network 120-3.

Access network 120-1 may be a network that provides a wireless (radio) interface to mobile devices 110 using the 3GPP Long Term Evolution (LTE) standard. Access network 120-1 may include, for example, one or more radio interface components (called base stations or eNodeBs) that may each communicate with mobile devices within a geographical area (e.g., a sector or cell) assigned to the radio interface component. Access network 120-1 may include other devices, connected through wired or wireless links, to provide services relating to the operation of access network 120-1. Access network 120-2 may be a network that provides a wireless (radio) interface to mobile devices 110 using the 4GPP LTE standard. As with access network 120-1, access network 120-2 may include one or more base stations that may each communicate with mobile devices within a geographical area.

Access network 120-3 may include a WiFi network, or multiple different WiFi networks, to which mobile devices 110 may connect. More generally, access network 120-3 may include any locally available wireless network. For example, a consumer may install a home WiFi router that may be used to connect the consumer's mobile device 110 to a wired network (e.g., a coaxial or fiber optic network) that is connected to the consumer's home. As another example, a business may install a number of WiFi access points that are used to wirelessly connect devices in a local office to a wired network.

Other types of access networks than those shown in FIG. 1 may be used to connect mobile devices 110 to network 130, such as, for example, a universal terrestrial radio access network (UTRAN). For example, in some implementations, a non-wireless access network may be used. Users may thus be able to attach a cable to mobile devices 110 to physically connect mobile devices 110 to a wired network.

Network 130 may include public or private (or both) IP network(s). Network 130, may be, for example, a packet-based wide area network. Network 130 may be used to implement an IMS architecture. IMS is an architectural framework for delivering IP multimedia services. In one implementation, network 130 may include logic to implement IMS services implemented by a session initiation protocol (SIP) application server. Examples of IMS services can include tracking and providing presence information, group list management functions, push to talk over cellular (PoC), voice over IP (VoIP) based on SIP, and peer-to-peer video sharing.

In some implementations, network 130 may connect to additional networks. For instance, network 130 may connect to a private network and a public network, such as the Internet.

Figure 2:
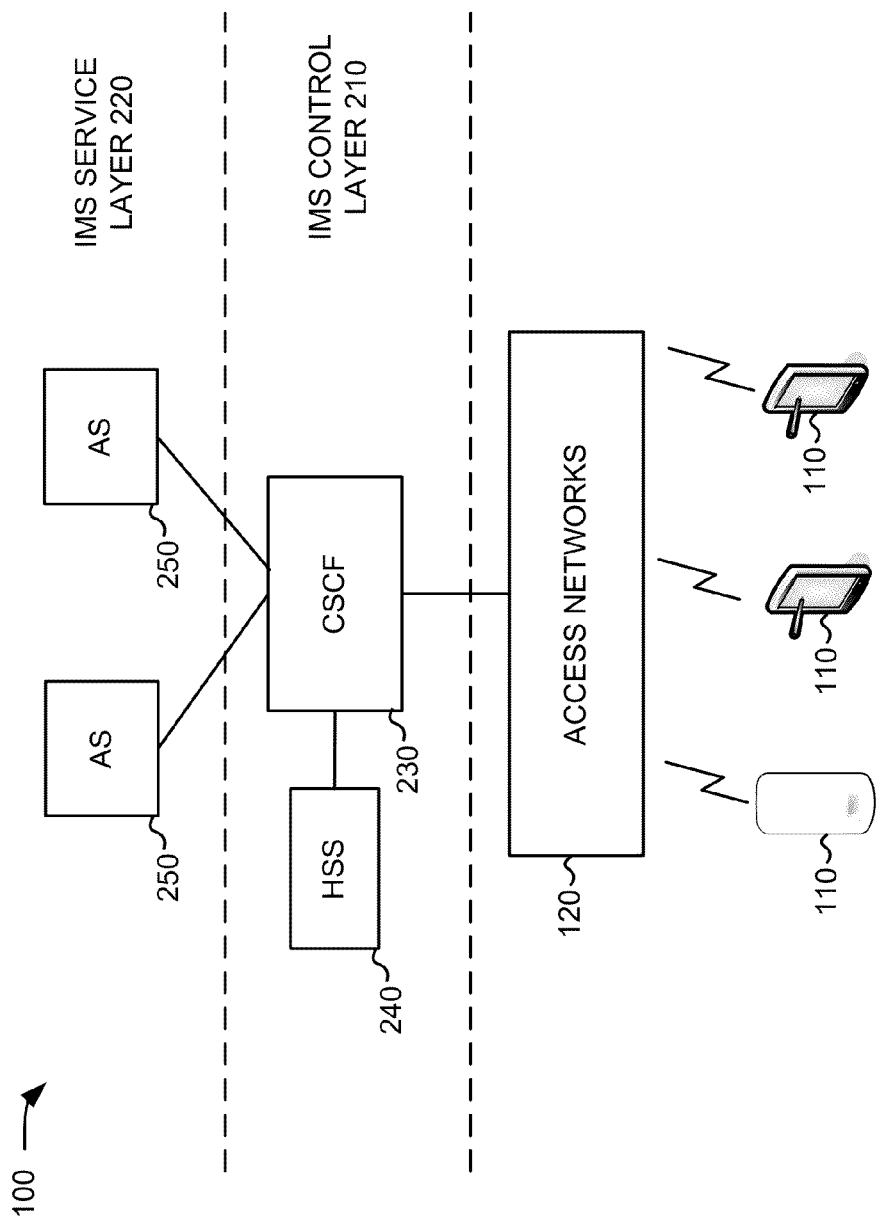
FIG. 2 is a diagram illustrating another view of the environment shown in FIG. 1.

FIG. 2 is a diagram illustrating another view of environment 100, in which network 130 is shown in more detail as a network that implements IMS. The IMS architecture may particularly include a control layer 210 and a service layer 220.

Control layer 210 may connect to mobile devices 110 through access networks 120. Control layer 210 may generally include servers for managing call or session set-up, modification, and release. As illustrated, control layer 210 may include a Call Session Control Function (CSCF) server 230 and a Home Subscriber Server (HSS) 240.

CSCF server 230 may generally act as a first point of contact for a mobile device 110 that is using IMS. CSCF server 230 may act as a central node in the signaling plane and may perform session control functions. For instance, CSCF server 230 may provide subscriber authentication services and may establish security associations with connecting mobile devices 110. CSCF server 230 may use a protocol such as the SIP for communications.

HSS 240 may maintain a master user database that supports the IMS network entities, such as CSCF server 230. HSS 240 may maintain subscription-related information (e.g., subscriber profiles) and may maintain information relating to a subscriber's location and IP information.

Service layer 220 may include application and content servers to implement value-added services for users of mobile devices 110. Service layer 220 may include one or more application servers (AS) 250, which may implement the services offered through IMS. Examples of such services may include presence information, group list management functions, and peer-to-peer video sharing. In some situations, a single AS 250 can implement multiple services.

Although FIGS. 1 and 2 show example components of environment 100, in other implementations, environment 100 may contain fewer components, different components, differently arranged components, and/or additional components than those depicted in FIGS. 1 and 2. Alternatively, or additionally, one or more components of environment 100 may perform one or more other tasks described as being performed by one or more other components of environment 100.

Figure 3:
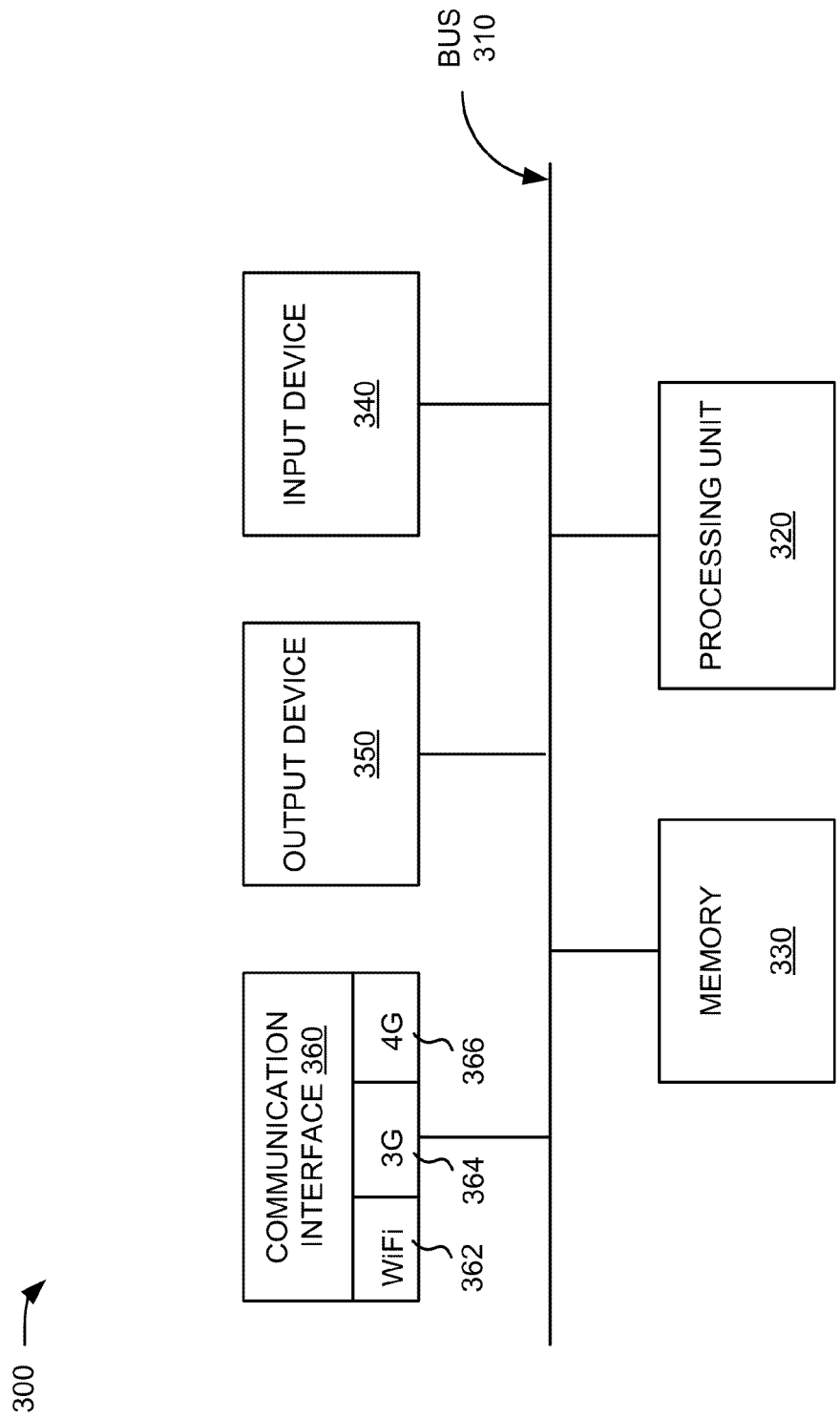
FIG. 3 is a diagram of example components of a device that may correspond to one of the components shown in FIGS. 1 and 2.

FIG. 3 is a diagram of example components of a device 300 that may correspond to one of the components shown in environment 100, such as mobile device 110, a device in an access network 120, CSCF server 230, HSS 240, or AS 250. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. Additionally or alternatively, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices.

In one implementation, in which communication interface 360 is included as part of a mobile device 110, communication interface may include logic for communicating with access networks 120. In FIG. 3, a WiFi component 362, a 3G component 364, and a 4G component 366 are particularly illustrated as being part of communication interface 360. These components may include circuitry, such as components to implement a transceiver, for wirelessly connecting to WiFi access network 120-3, 3G access network 120-1, and 4G access network 120-2. In some implementations, components 362, 364, and 366 may be combined or may share portions of the same transceiver circuitry. For example, 3G component 364 and 4G component 366 may share portions of or all of the antenna and other circuitry needed to connect to a 3G/4G network.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

Figure 4:
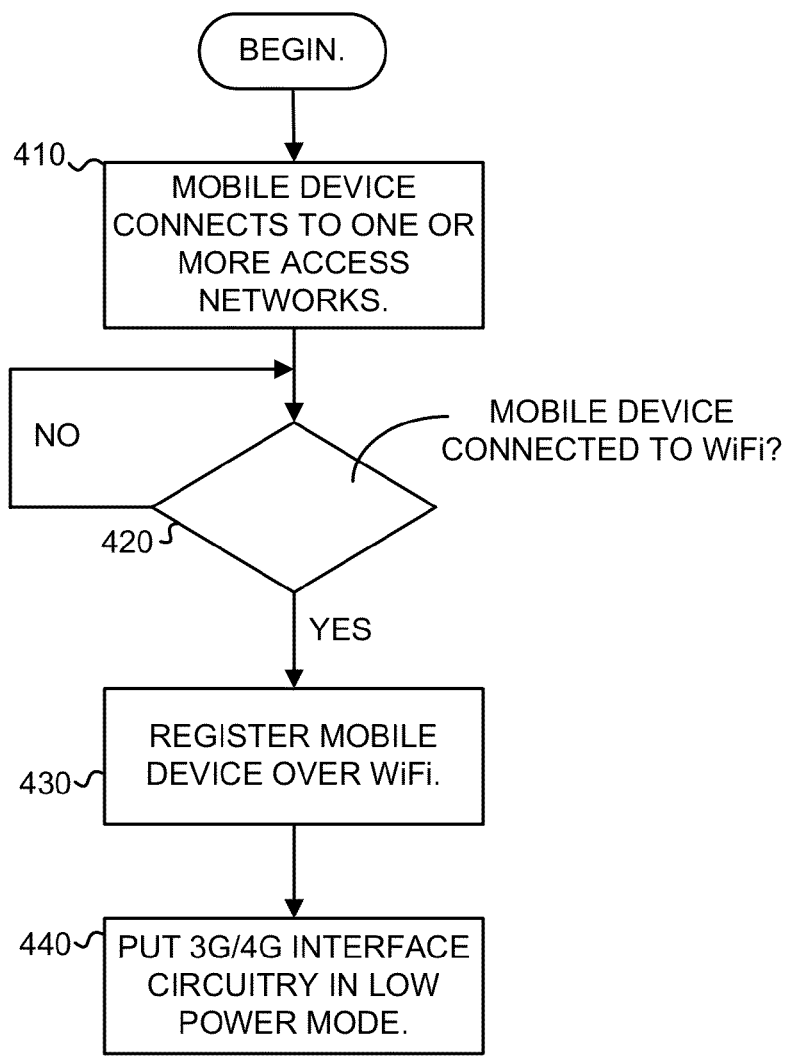
FIG. 4 is a flow chart illustrating an example process for connecting to an access network.

FIG. 4 is a flow chart illustrating an example process 400 for connecting to an access network. Process 400 may be performed, for example, by one of mobile device 110.

Mobile device 110 may connect to one or more access networks (block 410). For example, mobile device 110 may be configured to connect to certain WiFi access networks 120-3 whenever mobile device 110 is within range of the WiFi access networks. Similarly, mobile device 110 may connect to other access networks, such as 3G access network 120-1 and/or 4G access network 120-2, when mobile device 110 is within range of one of these access networks. Mobile device 110 may include access network priorities, so that, for example, mobile device 110 may preferentially connect to 4G access network 120-2 over 3G access network 120-1, but may always connect, when possible, to WiFi access network 120-3.

Process 400 may further include determining whether mobile device 110 is connected to a WiFi network (block 420). When mobile device 110 is connected to a WiFi network, (block 420—YES), mobile device 110 may register the connectivity to the WiFi network with an IMS network (block 430). For example, mobile device 110 may register (e.g., with network 130) its connectivity to the WiFi network using a SIP request message that includes a REGISTER method. Mobile device 110 may register with, for example, CSCF server 230 or HSS 240.

When connected to a WiFi network, mobile device 110 may control the circuitry, relating to non-WiFi access networks, to enter a low power mode (block 440). For example, mobile device 110 may control 3G component 364 and/or 4G component 366 to enter a sleep state, an off state, or another low power state. In this manner, battery power that may otherwise be used, in simultaneously connecting to multiple different access networks 120, may be conserved.

Figure 5:
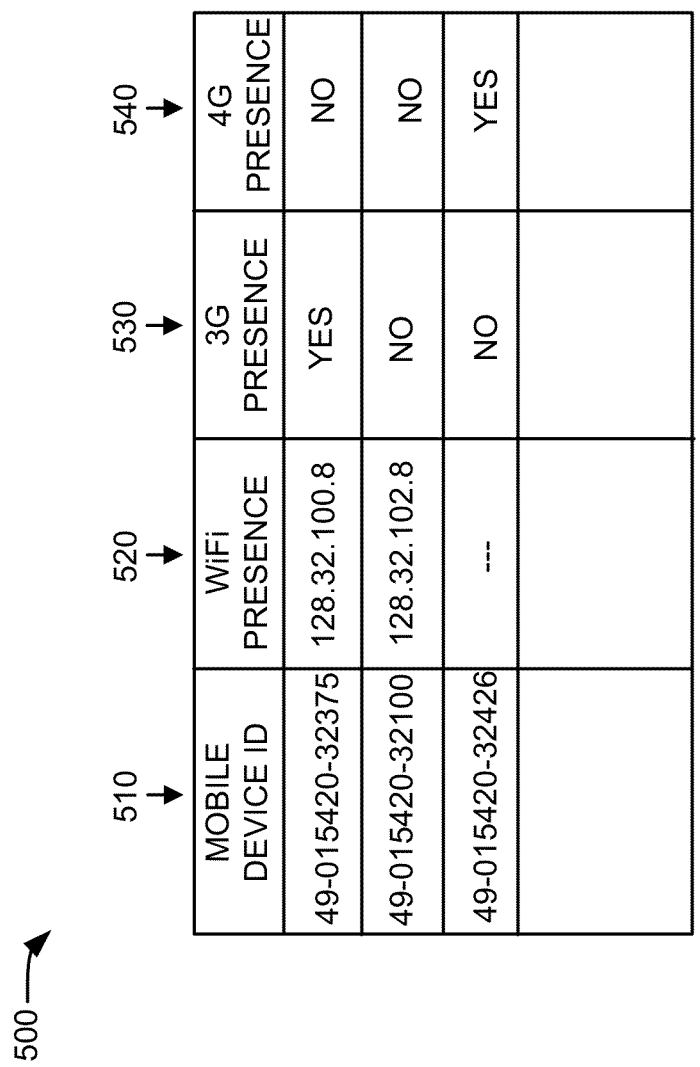
FIG. 5 is a diagram illustrating an example data structure that may store presence information for mobile devices.

FIG. 5 is a diagram illustrating an example data structure 500 that may store presence information for mobile devices 110. Data structure 500 may be maintained by, for example, CSCF server 230 and/or HSS 240. In general, data structure 500 may be used to store information relating to the current connectivity of mobile devices 110. As shown, data structure 500 may include a mobile device identification (ID) field 510, a WiFi presence field 520, a 3G presence field 530, and a 4G presence field 540.

Mobile device ID field 510 may store identification information corresponding to mobile devices 110. Mobile device ID field 510 may include a value that uniquely identifies mobile device 110. For example, the identification value may include an International Mobile Equipment Identity (IMEI) value that is assigned to mobile device 110. Other identification values, such as the telephone number associated with mobile device 110, may alternatively be used.

WiFi presence field 520, 3G presence field 530, and 4G presence field 540 may store information relating to the presence of mobile device 110 with respect to access networks 120. For example, these fields may indicate whether mobile device 110 is connected through WiFi access network 120-3, 3G access network 120-1, or 4G access network 120-2, respectively. Fields 520, 530, and 540 may be updated based on, for example, SIP messages received from mobile devices 110 and/or based on messages received from devices in access networks 120. In the example shown, WiFi presence field 520 may include an IP address of the corresponding mobile device 110, when it is connected to a WiFi network (e.g., the first mobile device in data structure 500 may be connected to a WiFi network and may be assigned the IP address 128.32.100.8). WiFi presence field 520 may be blank or include a non-valid IP address when the corresponding mobile device 110 is not connected to a WiFi network. Similarly, as shown in FIG. 5, 3G presence field 530 and 4G presence field 540 may include an indication, such as a YES/NO indication, of whether the corresponding mobile device 110 is connected to 3G access network 120-1 or 4G access network 120-2, respectively. In other implementations, fields 530/540 may include information other than boolean YES/NO values to indicate connectivity to a 3G/4G network, such as information identifying a particular eNodeB to which mobile device 110 is attached.

Although FIG. 5 shows example fields in data structure 500, in other implementations, data structure 500 may be structured differently or contain fewer fields, different fields, or additional fields.

Figure 6:
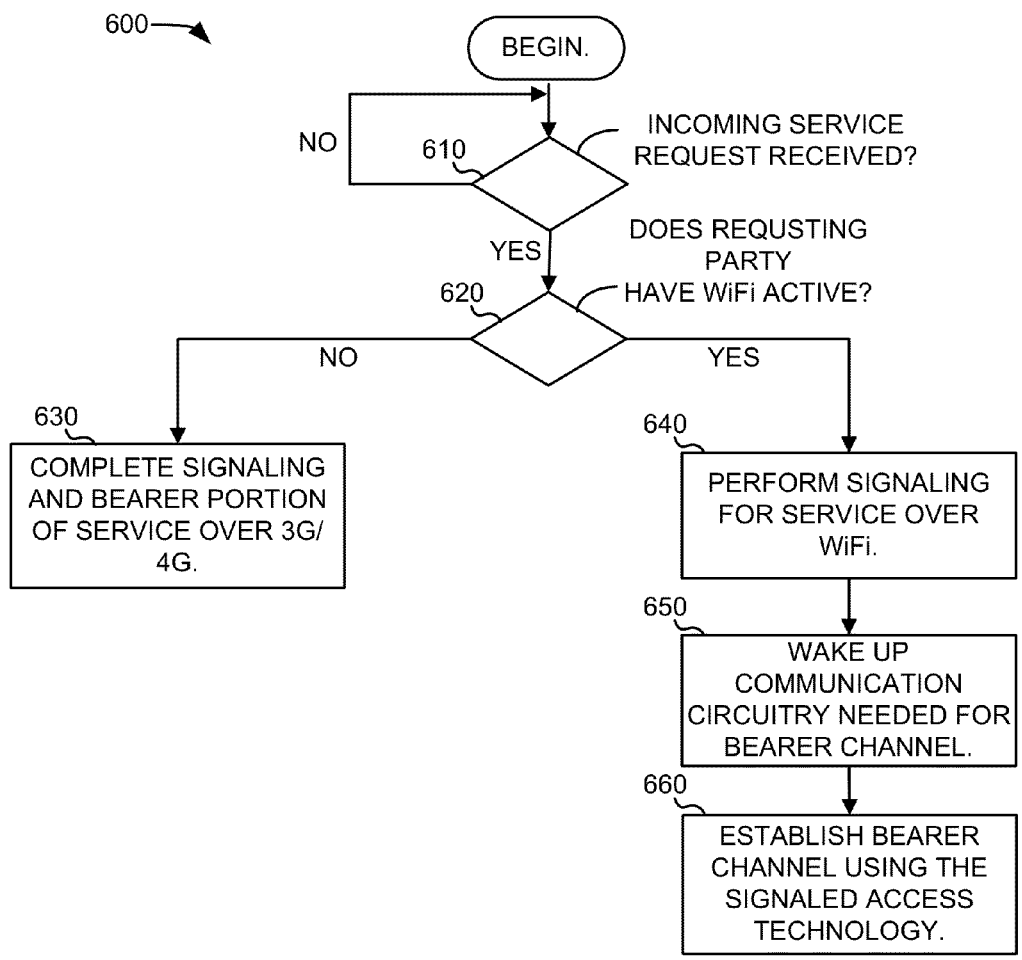
FIGS. 6 and 7 are flow charts illustrating example processes for establishing an Internet protocol (IP) multimedia session (IMS) service, such as a telephone or video call, using different access networks.

FIG. 6 is a flow chart illustrating an example process 600 for establishing an IMS service, such as a telephone or video call, using different access networks. Process 600 may be particularly applicable to IMS services in which the service request is made to a mobile device 110, such as a call request in which a first party calls a user of mobile device 110.

Process 600 may include determining whether an incoming service request is received (block 610). The service request may be, for example, a service request initiated by another party, such as a telephone (voice) call, a video call, or another service. Alternatively, the service request may be initiated by a device in network 130, such as a request for a mobile device 110, initiated by an application server 250. In one implementation, CSCF server 230 may receive and handle the service request. Alternatively, another IMS device in network 130, such as an application server 250, may receive the service request.

If a service request is received, (block 610—YES), process 600 may further include determining whether a requesting party has an active WiFi connection (block 620). Whether the requesting party has an active WiFi connection may be determined by, for example, looking up the requested party in data structure 500. For example, CSCF server 230 or an application server 250 may access HSS 240 to determine whether the requested party has an active WiFi connection.

If the requesting party is not connected to WiFi, (block 620—NO), the service may be completed using 3G/4G access networks 120-1 or 120-2 (block 630). For instance, both the signaling for the service, such as SIP-based signaling, and the bearer channel for the service, may be performed over a connected 3G/4G access network 120-1/120-2. For a telephone call, for example, initial signaling to establish the call may be performed using SIP messages transmitted through 3G/4G access networks 120-1/120-2. The bearer portion of the call may also be performed over 3G/4G access networks 120-1/120-2.

If the requesting party is connected to WiFi, (block 620—YES), the service may be completed using a combination of 3G/4G access networks 120-1/120-2 and WiFi access network 120-3 (blocks 640-660). The signaling for the service may be exchanged with the mobile device of the requesting party over WiFi access network 120-3 (block 640). For example, SIP-based signaling may be used to setup the bearer channel for the service. SIP messages may be transmitted over WiFi access network 120-3. The SIP messages may include at least one message (a "session description message") that provides a description of the bearer session needed for the service. For an audio call, for example, the session description message may identify a minimum required bit rate, an audio codec that is to be used, and preferred access technologies. In one implementation, the access technologies may be provided as a prioritized list of access technologies. For example, the list may be: a 4G access network first, a 3G access network second, and a WiFi access network third. This list may specify that the bearer channel for the service is to be over 4G access network 120-2, if it is available; over 3G access network 120-1 if 4G access network 120-2 is not available; and over WiFi access network 120-3 if neither 4G access network 120-2 nor 3G access network 120-1 is available.

Process 600 may further include waking up communication circuitry needed for a bearer channel (block 650). The communication circuitry may correspond to the component of communication interface 360 needed to complete the bearer channel. For example, if the preferred bearer access technology is 4G access network 120-2, a 4G base station is within range, and 4G component 366 is currently in sleep or low-power mode, 4G component 366 may be powered-up or otherwise activated. In some situations, the communication circuitry needed to establish the desired bearer channel may already be active. In this case, block 650 may be omitted.

Process 600 may further include establishing the bearer channel using the access technology that was determined using the signaling (block 660). For example, if, for a telephone call, a 4G access network is determined to be used, the bearer channel for the call may be established by mobile device 110 over 4G access network 120-2. In this manner, the signaling for the service (e.g., a telephone call) and the bearer channel that carries the substantive data for the service, may be separated.

Figure 7:
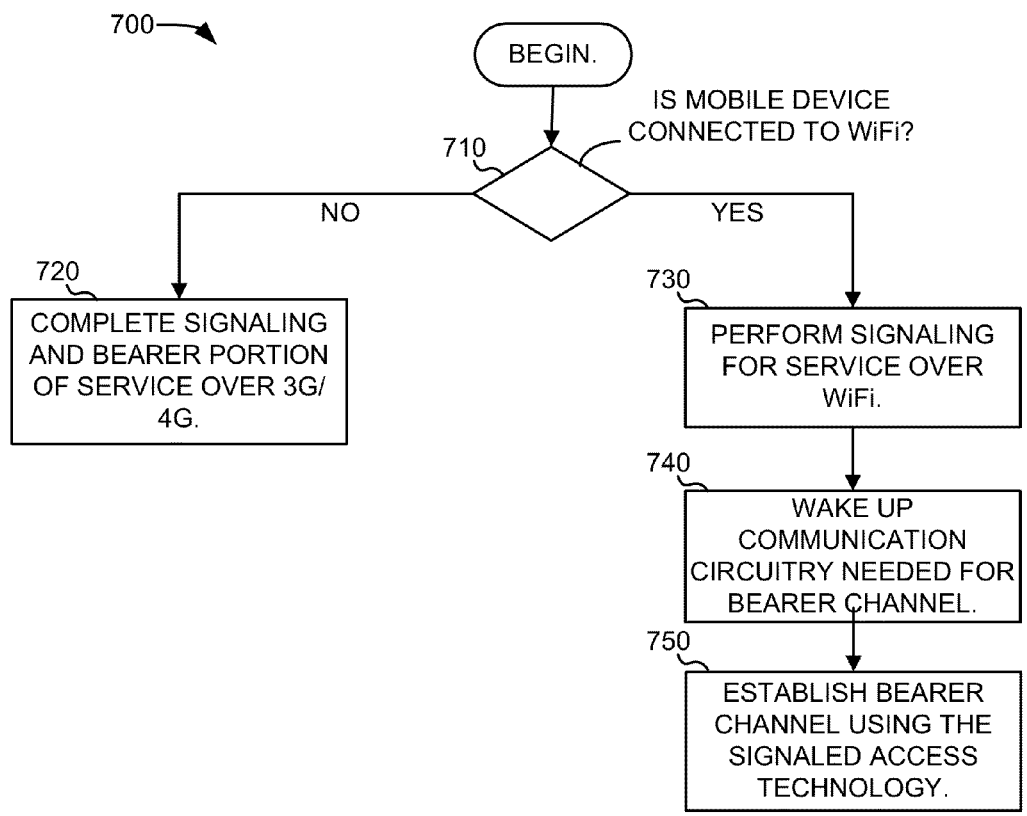

FIG. 7 is a flow chart illustrating an example process 700 for establishing an IMS service, such as a telephone or video call, using different access networks. Process 700 may be particularly applicable to the situation in which a mobile device 110 initiates an IMS service, such as by initiating a telephone call.

Process 700 may include determining whether WiFi is active at a mobile device (block 710). For example, mobile device 110 may determine whether it is connected to WiFi access network 120-3.

If the mobile device is not connected to WiFi, (block 710—NO), the service may be completed using 3G/4G access networks 120-1 or 120-2 (block 720). For instance, both the signaling for the service, such as SIP-based signaling, and the bearer channel for the service, may be performed over a connected 3G/4G access network 120-1/120-2. For a telephone call, for example, initial signaling to establish the call may be performed using SIP messages transmitted through 3G/4G access networks 120-1/120-2. The bearer portion of the call may also be performed over 3G/4G access networks 120-1/120-2.

If the mobile device is connected to WiFi, (block 710—YES), the service may be completed using a combination of 3G/4G access networks 120-1/120-2 and WiFi access network 120-3 (blocks 730-750). The signaling for the service may be exchanged over WiFi access network 120-3 (block 730). Block 730 may be performed similarly to block 640 (FIG. 6). For example, SIP-based signaling may be used to setup the bearer channel for the service. The SIP messages may be transmitted over WiFi access network 120-3. The SIP messages may include a session description message that provides a description of the bearer session needed for the service and may include a prioritized list of access technologies.

Process 700 may further include waking up communication circuitry needed for a bearer channel (block 740). As with block 650 (FIG. 6), the communication circuitry may correspond to the component of communication interface 360 needed to complete the bearer channel. In some situations, the communication circuitry needed to establish the desired bearer channel may already be active. In this case, block 740 may be omitted.

Process 700 may further include establishing the bearer channel using the access technology that was determined in the signaling (block 750). For example, if, for a telephone call, a 4G access network is determined to be used, the bearer channel for the call may be established by mobile device 110 over 4G access network 120-2. In this manner, the signaling for the service (e.g., a telephone call) and the bearer channel that carries the substantive data for the service, may be separated.

Figure 8:
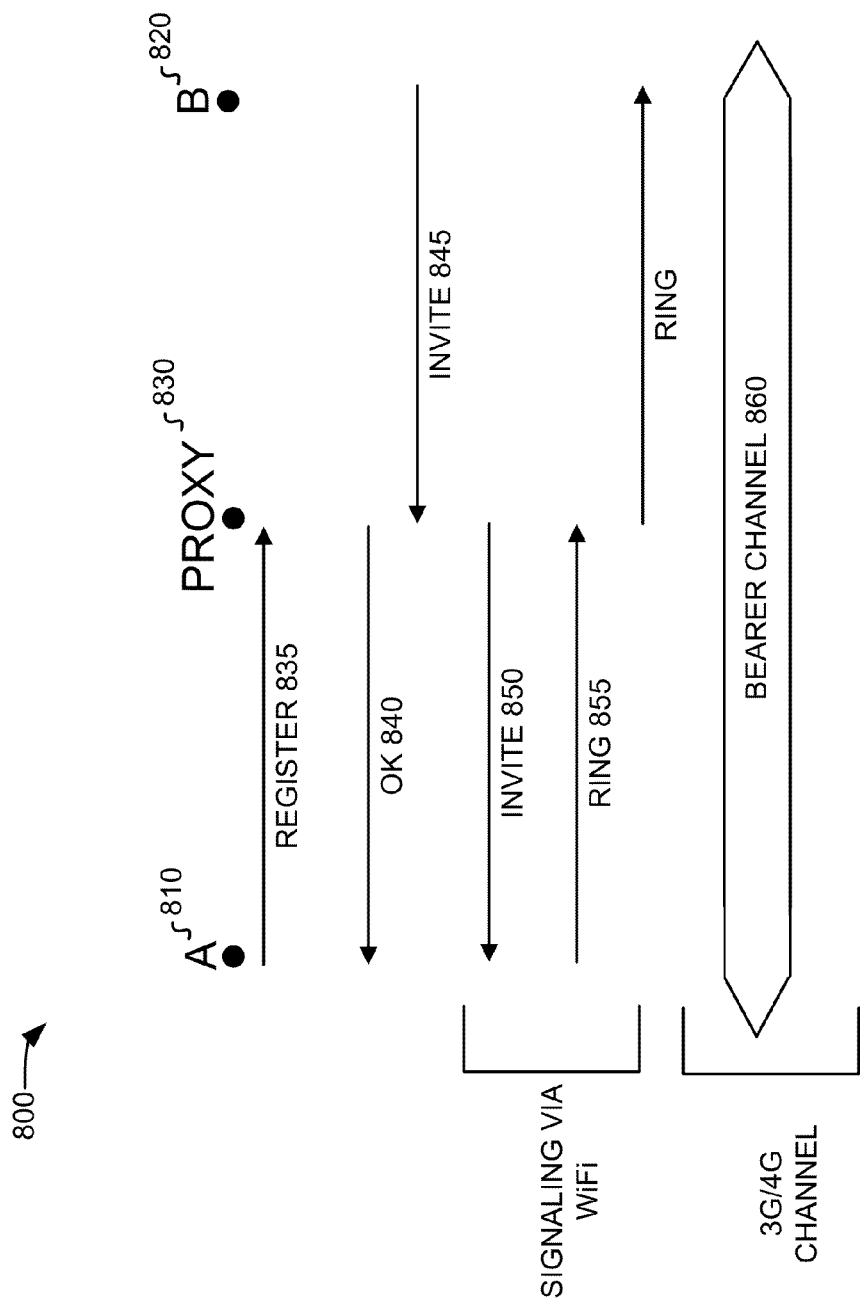
FIG. 8 is a diagram illustrating an example of a signal flow for setting up and maintaining a service, such as a telephone call, according to implementations described above.

FIG. 8 is a diagram illustrating an example of a signal flow 800 for setting up and maintaining a service, such as a telephone call, according to techniques described herein. In FIG. 8, two end-user devices 810 ("A") and 820 ("B"), and a proxy device 830, are illustrated. Assume that device 810 corresponds to a mobile device 110 that is a called party for a telephone call and that device 830 corresponds to a calling device for the telephone call. Device 830 may be a mobile device or another type of device, such as a fixed landline phone. Proxy 830 may be a SIP server device in the IMS architecture, such as one of application severs 250 or CSCF server 230.

At some point, device 810 may connect to WiFi access network 120-3. Device 810 may register the connectivity to WiFi access network 120-3 with proxy 830 (via register message 835) (see blocks 420 and 430, FIG. 4). The fact that device 810 is connected to a WiFi network may be stored in, for example, data structure 500. Proxy 830 may respond to message 835 to acknowledge the message registration (via OK message 840).

At some point, assume a user of device 820 decides to place a telephone call to a user of device 810. An invite message (invite messages 845 and 850) may be sent, through proxy 830, to device 810. Proxy 830 may determine that device 810 is connected to WiFi access network 120-3 and may proceed to route invite message 850 over WiFi access network 120-3 (see blocks 620 and 640, FIG. 6). Invite message 850, as well as additional messages that may be included in the signaling with device 810 (such as ring message 855), may all be sent using WiFi access network 120-3 as the signaling network. In one example, communication circuitry associated with cellular access networks, such as 3G and 4G access networks 120-1 and 120-2, may not need to be always active when device 810 is connected to a WiFi access network.

At some point, device 810 and 820 may establish a direct connection (via a bearer channel 860) for the bearer traffic (i.e., the data corresponding to the telephone call) (see blocks 650 and 660, FIG. 6). Bearer channel 860 may carry this traffic. Bearer channel 860 may be created over an access technologies specified in the signaling, such as a 3G/4G access network.

Although WiFi networks and 3G/4G LTE networks were used in the above description when describing different types of access networks. More generally, the access network used for the initial signaling may include any type of non-cellular access network, such as a wired connection, a Bluetooth connection, etc. Similarly, 3G/4G access networks 120-1/120-2 may, in general, include other types of cellular networks.

As described above, a service in an IMS architecture may be transmitted through split usage of radio access networks. Splitting the signaling and bearer channels across different access networks may advantageously provide for power savings in a mobile device 110 and/or provide for more efficient usage of the radio access networks.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4, 6, and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-readable medium storing instructions, the instructions comprising:
   one or more instructions that, when executed by a processor, cause the processor to:
      receive, from a mobile device, information indicating whether the mobile device is connected to a non-cellular access network;
      determine, based on a request for a service from the mobile device and the information, whether the mobile device is connected to the non-cellular access network;
      transmit, to the mobile device and when it is determined that the mobile device is connected to the non-cellular access network, one or more control messages, relating to establishment of the service, using the non-cellular access network;
      transmit, to the mobile device and when it is determined that the mobile device is not connected to the non-cellular access network, the one or more control messages using a cellular access network,
         the one or more control messages including a prioritized list of preferred access network technologies to use for a bearer connection that is to be established, for the service, between the mobile device and another device;
      establishing, by the mobile device and with the other device, the bearer connection for the service over the cellular access network; and
      setting transceiver circuitry for the cellular access network in a low power mode when the mobile device is connected to the non-cellular network.

2. The computer-readable medium of claim 1, where the instructions further comprise:
   one or more instructions that, when executed by the processor, cause the processor to:
      transmit, to an Internet Protocol (IP) multimedia session (IMS) server, a message to register a connection of the mobile device with the non-cellular access network.

3. The computer-readable medium of claim 1, where the instructions further comprise:
   one or more instructions that, when executed by the processor, cause the processor to:
      set the transceiver circuitry for the cellular access network to an active power mode based on an initiation of an establishment of the bearer connection over the cellular access network.

4. The computer-readable medium of claim 1, where the non-cellular access network includes a WiFi network, and
   where the cellular access network includes a 3GPP Long Term Evolution (LTE) standard network or a 4GPP LTE standard network.

5. The computer-readable medium of claim 1, where the service includes an Internet Protocol (IP) multimedia session (IMS) voice or a video call.

6. The computer-readable medium of claim 1, where the one or more control messages include one or more session initiation protocol (SIP) messages.

7. A method implemented by one or more devices, the method comprising:
   determining, by the one or more devices and based on a request for a service relating to a mobile device, whether the mobile device is connected to a non-cellular access network;
   transmitting, by the one or more devices and to the mobile device, when it is determined that the mobile device is connected to the non-cellular access network, one or more control messages, relating to establishment of the service, using the non-cellular access network;
   transmitting, by the one or more devices and to the mobile device, when it is determined that the mobile device is not connected to the non-cellular access network, the one or more control messages, using a cellular access network;
   receiving registration information, from the mobile device, indicating whether the mobile device is connected to the non-cellular access network;
   maintaining the registration information in a memory; and
   looking up a connection state of the mobile device in the memory,
      the one or more control messages including a prioritized list of preferred access network technologies to use for a bearer connection that is to be established, for the service, between the mobile device and another device.

8. A method implemented by one or more devices, the method comprising:
   determining, by the one or more devices and based on a request for a service relating to a mobile device, whether the mobile device is connected to a non-cellular access network;
   transmitting, by the one or more devices and to the mobile device, when it is determined that the mobile device is connected to the non-cellular access network, one or more control messages, relating to establishment of the service, using the non-cellular access network;
   transmitting, by the one or more devices and to the mobile device, when it is determined that the mobile device is not connected to the non-cellular access network, the one or more control messages, using a cellular access network;
   receiving registration information, from the mobile device, indicating whether the mobile device is connected to the non-cellular access network;
   maintaining the registration information in a data structure; and
   looking up a connection state of the mobile device in the data structure, the one or more control messages including a prioritized list of preferred access network technologies to use for a bearer connection that is to be established, for the service, between the mobile device and another device, and the non-cellular access network including a WiFi network and the cellular access network includes a 3GPP Long Term Evolution (LTE) standard network or a 4GPP LTE standard network.

9. The method of claim 7, where the service includes an Internet Protocol (IP) multimedia session (IMS) voice or a video call.

10. The method of claim 7, where the one or more control messages include one or more session initiation protocol (SIP) messages.

11. A device comprising:
a communication interface including a plurality of transceiver circuits for connecting to a plurality of radio access networks, the plurality of transceiver circuits including at least a WiFi access circuit and a cellular access network circuit;
a processor; and
a memory to store programming instructions that, when executed by the processor, cause the processor to:
connect to a WiFi network, using the WiFi access circuit, when a WiFi connection is available,
perform signaling for Internet Protocol (IP) multimedia session (IMS) services through the WiFi access network,
establish bearer connections for the IMS services, using the cellular access network circuit to connect to a cellular network, and
set the cellular access network circuit to a low power mode when the device is connected to the WiFi network and when the bearer connection is not established.

12. The device of claim 11, where the cellular access network circuit connects to a 3GPP Long Term Evolution (LTE) standard network or a 4GPP LTE standard network.

13. The device of claim 11, where the programming instructions further cause the processor to:
register a connection with the WiFi network with an Internet Protocol (IP) multimedia session (IMS) service.

14. The device of claim 11, where the programming instructions further cause the processor to:
set the cellular access network circuit to an active power mode based on establishing the bearer connection.

15. The device of claim 11, where the service includes an Internet Protocol (IP) multimedia session (IMS) voice or a video call.

16. The device of claim 11, where, when performing the signaling, the processor is to:
perform the signaling using one or more control messages that include one or more session initiation protocol (SIP) messages.

17. The method of claim 4, further comprising:
setting transceiver circuitry for the cellular access network in a low power mode when the mobile device is connected to the non-cellular network.

18. The method of claim 17, further comprising:
setting the transceiver circuitry for the cellular access network to an active power mode based on an initiation of an establishment of the bearer connection over the cellular access network.

19. The method of claim 8, where the service includes an Internet Protocol (IP) multimedia session (IMS) voice or a video call.

20. The method of claim 8, where the one or more control messages include one or more session initiation protocol (SIP) messages.

* * * * *